Feb. 26, 1924.   1,485,072
A. FARNER
DISINTEGRATOR AND FEEDER
Filed April 16, 1923
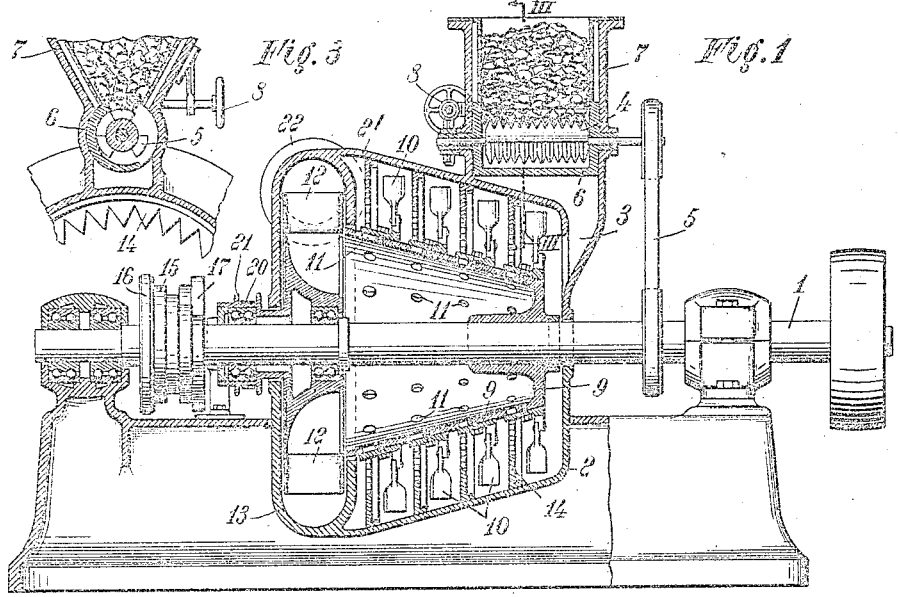
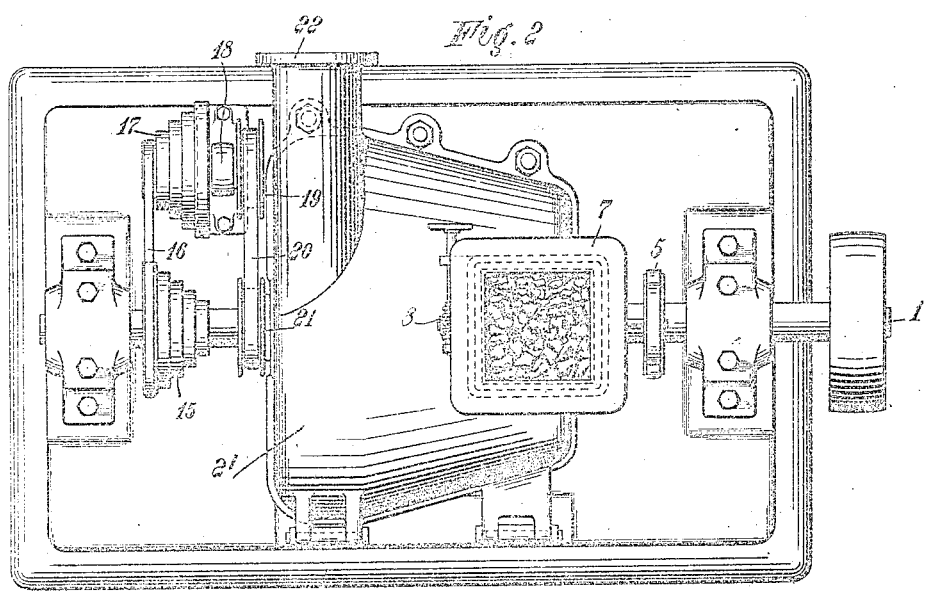
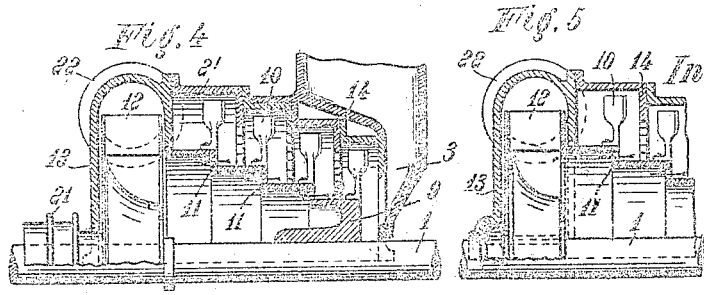

Patented Feb. 26, 1924.

1,485,072

UNITED STATES PATENT OFFICE.

AUGUST FARNER, OF KUSNACHT, NEAR ZURICH, SWITZERLAND, ASSIGNOR TO THE FIRM G. HUNZIKER, OF RUTI, CANTON ZURICH, SWITZERLAND.

DISINTEGRATOR AND FEEDER.

Application filed April 16, 1923. Serial No. 632,348.

*To all whom it may concern:*

Be it known that I, AUGUST FARNER, a citizen of the Republic of Switzerland, residing at 18 Rosenstrasse, Kusnacht, near Zurich, Switzerland, have invented certain new and useful Improvements in Disintegrators and Feeders, of which the following is a specification, reference being had therein to the accompanying drawing.

The invention has reference to a disintegrator which is particularly suited for supplying coal dust to coal dust burning furnaces and which comprises a rotating hollow body provided at its outer circumference with beaters, whereby the produced dust (coal dust) has to flow through the hollow rotor on leaving the mill. Up to the present devices of this type were provided with a cylindrical hollow body i. e. with a hollow shaft having holes in its shell for the dust to pass through. Such devices are, however, disadvantageous owing to the centrifugal action causing the dust to adhere to the inner wall of the hollow shaft and form lumps which fall off from time to time. The formation of lumps occurs especially when the material to be disintegrated is not perfectly dry, and it causes a very irregular delivery of dust.

This drawback is overcome by the disintegrator according to the present invention in which the rotating hollow body through which the disintegrated material passes consists of a drum the shell of which widens out in the direction in which the disintegrated material or dust leaves the disintegrator. With this constructional form of the hollow body, the centrifugal action inside the hollow body facilitates the discharge of the treated material so that an accumulation of the dust inside the hollow body is prevented.

Constructional examples of the subject matter of the present invention are illustrated on the accompanying drawings, in which:

Fig. 1 is a vertical longitudinal section through a first form and

Fig. 2 is a plan view thereof,

Fig. 3 shows part of a vertical section along the line III—III of Fig. 1.

Figs. 4 and 5 show parts of longitudinal vertical sections of modified forms.

In these drawings, 1 denotes the belt driven shaft of the disintegrator and 2 is the casing, the top half 2' of which is hinged to the lower half. 3 is a duct through which the material to be disintegrated is supplied. It is assumed that coal is disintegrated in this mill, the coal being subjected to a preliminary disintegration by means of a cutter 4. To the cutter 4 rotation is imparted by a belt drive 5 from the mill shaft 1, a stationary shell 6 partly surrounds the cutter, the coal, on being filled into the hopper 7, is fed by gravity to the cutter. The shell 6 determines the passage area from the hopper 7 to the feed duct 3 of the mill and this passage area may be manually adjusted or completely shut off by actuating the worm gear 8 and causing thereby a turning of the shell. 9 denotes the drum secured to the shaft and rotating with the latter, the exterior of the shell of the drum is provided with beaters 10 the working faces of which are at an angle to the axis of the mill and further holes 11 are provided in the shell to permit the material treated to pass through. The drum widens out in the direction in which the treated material leaves the disintegrator and at the wider end of the drum a fan with blades 12 is arranged. 13 denotes the fan casing connected to the casing 2 of the disintegrator, from which casing the dust into which the treated material has been converted is sucked and is delivered, for instance, to the furnace in which the coal dust is burned. Rings 14 the inner circumference of which is provided with serrations or teeth are arranged in the mill casing between the rows formed by the beaters 10. The force with which the material is thrown by the rotating beaters in a radial direction against the mill casing and the serrated rings 14 greatly enhances the disintegrating process.

According to the first constructional form illustrated in Figs. 1–3 the drum is provided with a conical shell. The beaters 10 are fixed to the drum in an adjustable manner with regard to the adjacent row of the holes 11 by means of bolts passing through slots arranged in a foot portion of the beaters, so that the foot portion may close to a greater or smaller extent a hole 11 situated behind the beater when looking in the direction of rotation. In this manner a regulation of the suction acting on the dust whirling behind the beaters is possible as the suction action and thereby the removal of the dust as regards quantity and fineness is dependent on said adjustment. The shell of the disintegrator casing is of a conical shape according to the shape of the drum so that a conical intermediate space is present in which space the material is disintegrated. The beaters 10 have the tendency to throw the material back in the direction in which it has entered the mill.

Whereas the drum 9 is rotated by the shaft 1 a driving device for the rotor 12 of the fan is provided which permits altering the speed of the fan. In the constructional example illustrated this driving device comprises a step pulley 15 fixed to the shaft 1 which imparts rotation to a step pulley 17 by means of a belt 16, the step pulley 17 being arranged on a countershaft parallel to the shaft 1 and situated at the same elevation as the latter. This countershaft which is rotatably mounted in the bearing 18 carries further a belt pulley 19 which transmits the rotating movement by the belt 20 to the belt pulley 21 and thereby to the rotor 12 of the fan. The shaft 1 passes through the belt pulley 20 and the latter is connected to or integral with the rotor 12 of the fan, this rotor being rotatably mounted by ball bearings on the shaft 1. By shifting the belt 16 on the step pulleys 15, 17 the ratio between the speed of the fan 12 and the speed of the shaft 1 of the mill can be altered at will within the given limits; in this manner the suction action of the fan can be adjusted to suit the specific gravity of the material to be disintegrated, the fineness of the disintegration depending on this suction action.

The casing of the fan is provided with an outlet branch 22 through which the coal dust obtained is delivered from the casing to the furnace.

In the constructional example illustrated in Fig. 4 the enlargement of the shell of the drum in the direction in which the dust is discharged is carried out in steps. The openings 11 through which the dust or the mixture of dust and air respectively passes are arranged in the disc parts connecting the steps, the axes of the holes being thus parallel to the shaft 1. The shell of the mill casing is shaped to correspond to the stepped form of the drum, so that annular spaces are present between drum and shell in which spaces the disintegration of the material takes place.

The constructional example illustrated in Fig. 5 differs from that shown in Fig. 4 inasmuch as the step on the enlarged end of the drum is built to act as rotor of the fan, the fan blades 12 being integral with the drum. In this case the separate gear for driving the fan is dispensed with.

In consequence of the enlargement of the space enclosed by the drum in the direction in which the dust leaves the mill with all the constructional examples the accumulation of dust inside the drum i. e. the formation of lumps of dusty material is prevented whereby a uniform delivery of dust is obtained.

I claim:

1. In a disintegrator, a casing, a hollow rotor thereon, and having openings therethrough, communicating means between the rotor and casing and means for withdrawing the finer material inwardly through said openings in opposition to centrifugal action.

2. In a disintegrator particularly adapted for feeding coal dust furnaces in combination, a stationary casing, a rotor formed as a hollow drum having holes therein to permit passage of the comminuted material through the interior thereof and whose shell is shaped as a convex surface of a cone so that the shell widens out in the direction in which the treated material leaves the disintegrator, and beaters fixed to the outside of said shell and acting upon the material to be disintegrated.

3. In a disintegrator particularly adapted for feeding coal dust furnaces in combination, a stationary casing, a rotor formed as a hollow drum having means to permit comminuted material to enter the drum and be discharged through the interior thereof and whose shell is shaped as a convex surface of a cone so that the shell widens out in the direction in which the treated material leaves the disintegrator, beaters fixed to the outside of said shell and acting upon the material to be disintegrated, and a fan situated at the large end of said drum for generating the suction action by which the disintegrated material is removed.

4. In a disintegrator particularly adapted for feeding coal dust furnaces in combination, a stationary casing, a rotor formed as a hollow body whose shell widens out in the direction in which the treated material leaves the disintegrator, said shell being provided with holes for the treated material to pass through, and beaters adjustably fixed to the outside of the rotor and controlling the effective area of said holes on being adjusted.

5. In a disintegrator particularly adapted for feeding coal dust furnaces in combination, a stationary casing, a rotor formed as a hollow body whose shell widens out in the direction in which the treated material leaves the disintegrator, said shell being provided with holes for the treated material to pass through, a fan situated at the large end of said rotor, and adapted to generate the suction action by which the disintegrated material is removed, means to drive said rotor, means to drive said fan, and means to alter the speed of the fan relatively to the speed of the rotor.

6. In a disintegrator particularly adapted for feeding coal dust furnaces in combination, a stationary casing, a rotor formed as a hollow drum whose shell is shaped as a convex surface of a cone so that the shell widens out in the direction in which the treated material leaves the disintegrator, beaters fixed to the outside of said shell and acting upon the material to be disintegrated, a fan situated at the large end of said rotor and adapted to generate the suction action by which the disintegrated material is removed, means to drive said rotor, and a driving gear including step pulleys for driving said fan and to alter the speed of the fan relatively to the speed of the rotor.

7. In a disintegrator for feeding coal-dust furnaces the combination with a hollow rotor having openings therethrough, disintegrating means on the exterior of the rotor imparting centrifugal action to the material and means to exhaust the comminuted material through the centre of said rotor contrary to the centrifugal action on the comminuted material.

8. In a disintegrator for feeding coal dust furnaces, the combination with a stationary casing and a hollow, perforated, a rotor and beaters thereon; of a fan to exhaust the centre of said hollow disintegrator.

9. In a disintegrator for feeding coal dust to furnaces, the combination with a stationary casing, a shaft therein, and a hollow perforated substantially conical rotor on said shaft; of an exhaust fan at one end of said drum, said fan being driven from said shaft and comminuting means between the rotor and casing.

In testimony whereof I affix my signature.

AUGUST FARNER.